Sept. 29, 1931.   W. J. PEELLE   1,825,282
APPARATUS FOR MANUFACTURING RUBBER PRODUCTS
Filed Feb. 1, 1929   2 Sheets-Sheet 2
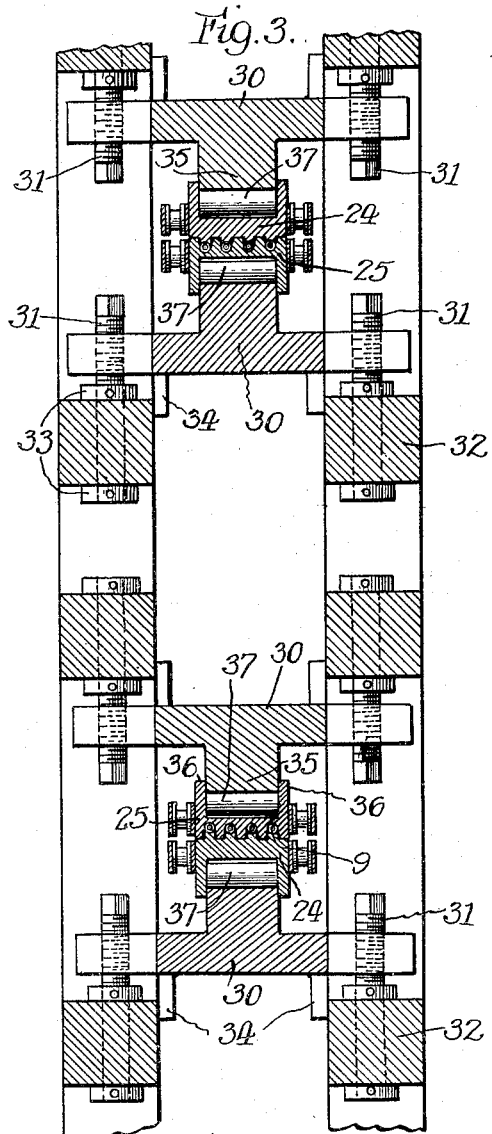
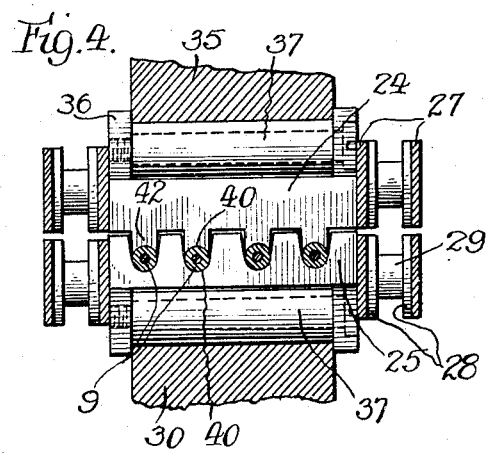
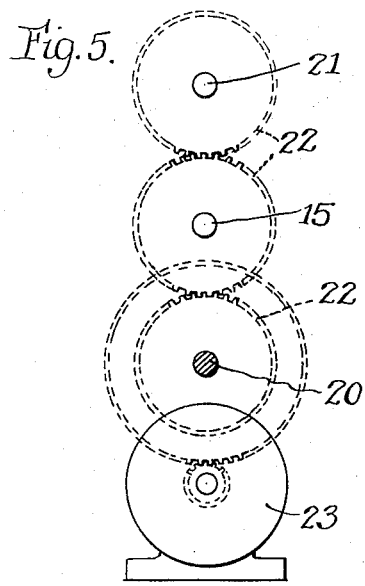
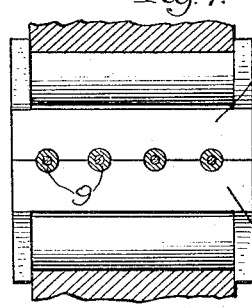
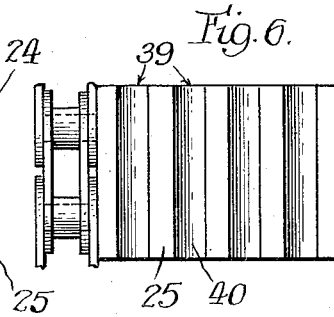
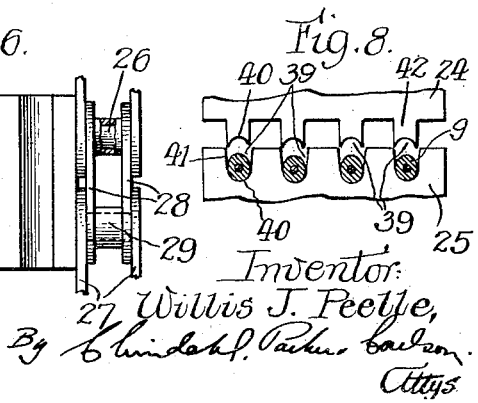
Inventor:
Willis J. Peelle,
By Lindahl, Parker Carlson
Attys Patented Sept. 29, 1931

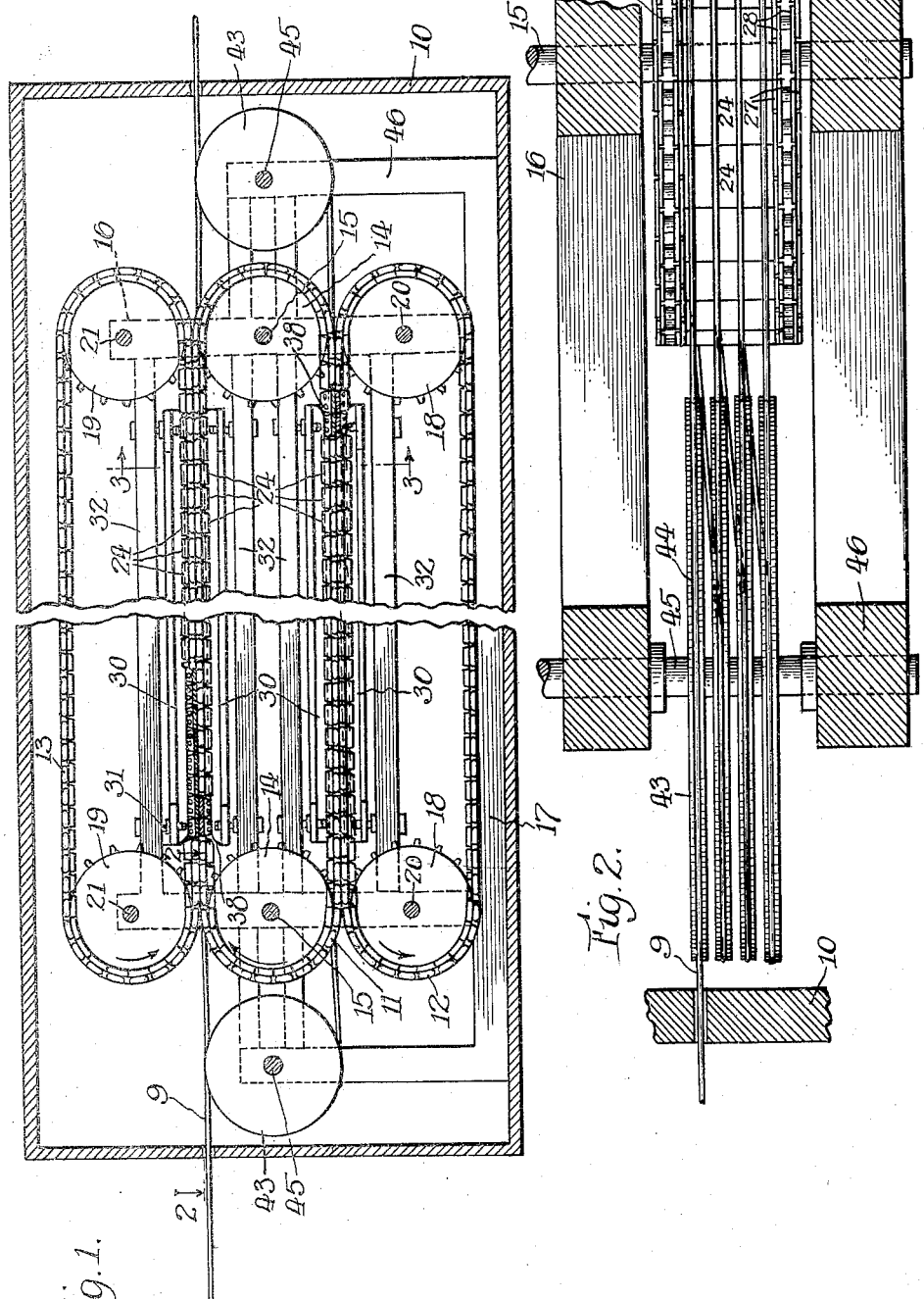

1,825,282

UNITED STATES PATENT OFFICE

WILLIS J. PEELLE, OF CHICAGO, ILLINOIS

APPARATUS FOR MANUFACTURING RUBBER PRODUCTS

Application filed February 1, 1929. Serial No. 336,893.

This invention relates to improvements in the manufacture of rubber products, such as rubber-covered wire, and has more particular reference to the vulcanization of rubber-covered wire after the formation thereof by extruding a covering of prepared rubber or rubber composition around the wire proper.

The primary object of the invention is to provide a new and improved method and apparatus by which the vulcanization of rubber-covered wire is greatly simplified and materially hastened to the end that the resulting product is of uniform quality, more perfectly formed and substantially reduced in cost.

In carrying out this object, the wire, after being covered in the usual way, is caused to travel progressively through a heated chamber maintained at the proper vulcanizing temperature, and while thus moving continuously through the chamber to determine the period of vulcanization, the wire is subjected to mechanical pressure which contracts the rubber coating uniformly about the wire.

The invention also aims to provide a novel means for advancing the wire through the vulcanizing chamber and applying mechanical pressure to the entire surface of the wire covering.

A further object is to provide a compactly arranged conveyor system adapted to accommodate a long length of wire within a comparatively small vulcanizing chamber, thereby enabling wire to be vulcanized at a rapid rate.

Further objects and advantages of the invention will become apparent from the following detailed description taken in connection with the accompanying drawings, in which Figure 1 is a vertical sectional view of a vulcanizing apparatus embodying the features of the present invention.

Figs. 2 and 3 are sections taken respectively along lines 2—2 and 3—3 of Fig. 1.

Fig. 4 is an enlarged sectional view of a portion of the apparatus shown in Fig. 3.

Fig. 5 is an elevational view of the driving means for the apparatus.

Fig. 6 is a plan view of one of the links used in the present apparatus.

Fig. 7 is a sectional view corresponding to Fig. 4, but showing a modification of the compression device used in the present apparatus.

Fig. 8 is a fragmentary view corresponding to Fig. 4 with the coacting compression links approaching operative relation.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

The apparatus shown in the drawings is adapted for vulcanization of rubber-covered wire in accordance with the process outlined above and comprises generally two traveling compression devices arranged to act on and apply mechanical pressure to successive sections of wire to be vulcanized and mounted to move continuously through a heated chamber at a substantially uniform rate. Herein the chamber is defined by an oven closure 10 which may be heated by suitable means (not shown) to the desired vulcanizing temperature, which temperature may be maintained substantially constant by regulating apparatus of any preferred character.

In the present instance, two compression devices are employed, these being formed by endless conveyor chains 11, 12 and 13 arranged side by side in parallel relation and having cooperating straight runs between which successive lengths of a wire 9 may be compressed during the advance thereof through the heated chamber. While only two of these conveyors and therefore only one compression device need be employed, the vulcanizing capacity of the apparatus can be greatly increased and the structure required for a given rate of vulcanization may be simplified by combining three conveyors, as shown in Fig. 1, two of these cooperating with separate straight runs of the third or intermediate conveyor. This enables the wire during treatment to be passed back and forth through the heated chamber, thereby utilizing at all times substantially the entire length of the intermediate conveyor.

The conveyor chain 11 passes around and is supported by two pairs of sprockets 14 rigid with shafts 15 which are journaled in rigid frame standards 16 upstanding from a bed 17 of the machine within the oven structure. Likewise, the conveyor chains 12 and 13 are carried by sprockets 18 and 19 on shafts 20 and 21 journaled in the standards. The chains are of substantially equal lengths, and when thus arranged, provide two pairs of cooperative runs between which the wire 9 may be led to effect compression thereof in any desired number of steps.

In order that the cooperative runs of chains will be advanced in synchronism while the wire 9 is clamped between them, the sprockets 14, 18 and 19 are made of equal diameters and are driven at equal speeds in the direction indicated by the arrows in Fig. 1. One way of effecting such drive is through the medium of intermeshing gears 22 (Fig. 5) fast upon one set of shafts 15, 20 and 21. Suitable means, such as an electric motor 23, located externally of the oven and geared to the extended end of the shaft 20 may be utilized as a source of driving power.

When the chains are driven at the same peripheral speed as that at which the wire to be vulcanized is formed in the extruding machine, the freshly covered wire may be led directly from such machine into the vulcanizing oven. In such a case, the motor should be operated at substantially constant speed and the driving gearing for the conveyor chains should be so proportioned as to provide for a peripheral speed equal to the rate at which the wire is being covered. An arrangement of this character is advantageous in that it avoids unnecessary handling and storage of the freshly covered wire; nevertheless, it is contemplated that the present apparatus may be supplied with unvulcanized wire from storage rolls.

In the form herein illustrated, each of the conveyor chains 11, 12 and 13 is composed of a series of individual links or blocks 24 and 25 which are substantially rectilinear in shape and pivotally connected in closely spaced end-to-end relation so that the trailing end of one block will abut substantially against the leading end of the succeeding block, as shown in Fig. 2, when such blocks are being advanced in a rectilinear path.

To provide for such relation of the blocks and for the degree of flexibility necessary to permit the conveyor to travel around its supporting sprockets, each block has two rigid studs 26 (Fig. 6) projecting from each of its side edges near opposite ends thereof. Each of the studs is pivotally connected to two plates 27 which are similarly connected at their other ends to the adjacent stud of the next link. The two studs 26 of any one link are rigidly connected by plates 28 between which are rollers 29 to reduce friction. These rollers are spaced to receive the teeth of the driving sprockets between them.

Means is provided for guiding the opposed blocks 24 and 25 of the cooperating chains in parallel rectilinear paths and for urging the blocks toward each other to cause mechanical pressure to be applied to the wire 9 located between them. This means preferably comprises a pair of bars 30 extending substantially the entire length of the cooperating chain runs and stationarily mounted on opposite sides of the blocks so as to exert a cam action thereon as an incident to the advance of the blocks. In the present instance, the bars 30 are T-shaped in form with their side flanges receiving the threaded portions of rotatable bolts 31 journaled in cross bars 32 and held against axial movement by collars 33. The cross bars 32 rigidly connect the standards 16 and receive between them flanges 34 on the guide bars 30, thereby serving to hold the latter against lateral displacement. A rib 35 on each bar 30 is received in a longitudinal groove defined by flanges 36 on the back of each block 24 and 25, and the straight guide faces of the ribs bear against anti-friction rollers 37 mounted between the flanges 36 and spaced longitudinally of the blocks. Tipping of the blocks relative to the bars 30 is thus prevented and lateral displacement of the blocks is avoided by the guiding action of the ribs 35 coacting with the flanges 36. By adjusting the bolts 31 the relation of the guide bars 30 may be changed as desired to vary the pressure exerted on the blocks or to accommodate blocks of different sizes which may be required for vulcanizing wire of different sizes.

Preferably, the guide bars 30 are beveled at their ends to form converging surfaces 38 (Fig. 1) which cam the blocks 24 and 25 into proper relation as the blocks are advanced into operative association with the bars 30.

To mold the covering of the freshly covered wire into proper shape by uniformly compressing the same between the coacting blocks 24 and 25, the opposed faces of the blocks are formed with one or more longitudinal grooves, generally designated by the numeral 39 (Fig. 8), each of which registers with the corresponding groove of the opposed block when the blocks are brought together. The grooves have surfaces 40 of semi-circular contour so that in the compression of the wire between the blocks, the covering is molded into circular form, which is usually the shape preferred for rubber-covered wire. The grooves of the connected blocks correspond in lateral spacing so that when successive blocks are traveling along the guide bars 30, a continuous straight groove is formed throughout the combined lengths of such blocks. Owing to the practical inability to provide a pressure-tight fit at the junction of the adjacent blocks, a small amount of the more or less plastic covering of the wire may be squeezed into the crevices of the blocks, thereby forming fins of unobjectionable size partially or completely surrounding the wire at spaced points. The presence of these fins will serve to identify the wire made by my improved process, thereby avoiding the necessity for including a colored thread or the like in the outer cloth covering formed about the rubber coating, which is now the common means of identifying rubber-covered wire.

Herein, the cooperating blocks 24 and 25 are of solid metal construction and the grooves 39 may be cut directly in their flat faces, as shown in Fig. 7, in which case the blocks are of identical construction and compression is effected by bringing the flat faces of the blocks into contact. In compressing the wire with blocks of this character, some of the covering may be extruded into the crevices between the faces of the cooperating blocks, thereby forming small longitudinal fins along the vulcanized covering.

It is preferred, however, to employ blocks constructed as shown in Fig. 4, having a tongue and groove engagement so that the mechanical pressure will be applied to the wire covering when such covering is completely enclosed. To this end, the grooves 39 in the blocks 25 of the conveyor chain 11 are made relatively deep and with slightly converging sides 41 terminating in the curved surface 40. The surfaces 41 are spaced to receive between them a tongue 42 on the cooperating block 24, which may have straight side surfaces fitting snugly within the groove of the opposed block. The groove 40 in these blocks is formed along the tongue and intersects with the straight sides of the tongue to form relatively sharp edges.

The action of the tongue 42 in compressing the wire is illustrated in Figs. 4 and 8, the latter showing the wire 9 drawn into the bottom of the grooves in the block 25, giving the covering a slightly oval shape. Then as the blocks are brought closer into operative association, as shown in Fig. 4, the curved tongue surface engages and compresses the covering to form a truly circular cross section. Thus, when the mechanical pressure is actually applied to the wire the covering thereof is completely surrounded by the coacting portions of the tongue and groove. This minimizes the tendency for any part of the rubber to squeeze out at the junction of the two curved surfaces.

As above explained, the wire being vulcanized may be passed alternately back and forth through the two compression devices formed by the three conveyor chains in order to increase the speed of vulcanization without decreasing the time to which the wire is exposed to the vulcanizing heat. Obviously, any desired number of such passes may be made and the same or different cooperating chains may be employed. In the present instance, I have provided blocks with four complemental grooves 39 so that the direction of movement of the wire may be reversed six times when the wire is fed in from one end of the oven and led out from the other end, as shown in Fig. 1. It is also contemplated that one vulcanizing apparatus of the above character may accommodate the product from several covering machines, in which case each of such machines might be assigned to certain of the complemental grooves formed in the chain blocks.

It will be observed that flexing of the block 25 as the conveyor chain 11 is led around its supporting sprockets 14 is attended by longitudinal separation of the outer ends of the adjacent blocks which spreading, if not compensated for, would stretch and even break the wire sections. This results from the fact that the blocks necessarily must be relatively thick and of substantial length. To avoid this condition, the wire is withdrawn from the blocks of both cooperating chains at the end of each straight chain run and is then led around an idler drum 43 before being directed into the next set of compression blocks. Preferably, the idlers are of relatively large diameter so that the bending of the partially vulcanized wire in following the contour of the idlers is not objectionable. As shown in Fig. 2, peripheral grooves 44 may be formed in the idler drums to maintain the different loops of wire separated. The idler drums are fast on shafts 45 journaled at opposite ends in auxiliary standards 46 within the oven and are spaced close to the ends of the conveyor chain 11 so as to minimize the time interval during which the pressure on the wire being vulcanized is relieved.

It will be apparent from the foregoing that I have provided an efficient method of vulcanizing rubber-covered wire which results in the production of wire at a substantially reduced cost, because handling and storage of the freshly covered wire is eliminated. In addition, the wire is of uniform quality, because of the accuracy with which the temperature and pressure employed may be regulated. With the higher pressures obtainable in the present apparatus, the coating of the wire when vulcanized adheres tenaceously to the wire proper and possesses a high degree of toughness. It should be noted that the block of one chain need not coincide exactly with the block of the other chain, but that such block may overlap the point of junction between adjacent blocks in the cooperating chain. In such a case, the identifying fins would extend only partially around the rubber covering. By passing the wire successively through different sets of compression devices, the size of the fins formed on the surface of the covering would be reduced to a minimum, inasmuch as the fins formed by one set of blocks would not ordinarily register with the points of junction in the next set of blocks engaging it.

I claim as my invention:

1. An apparatus for vulcanizing rubber covered wire combining means providing a vulcanizing chamber, an endless conveyor chain having two parallel portions guided for movement in rectilinear paths, a second conveyor chain having a straight run guided for movement in unison with one of said straight portions of the first mentioned chain, and a third conveyor chain disposed opposite the other straight portion of said first mentioned chain and driven in unison therewith, the cooperating portions of said first and second chains and the cooperating portions of said first and third chains constituting two compression means through which a continuous length of wire to be vulcanized may be passed successively.

2. An apparatus for vulcanizing rubber covered wire combining means providing a chamber maintained at a vulcanizing temperature, an endless conveyor chain having two portions guided for movement in different directions and in rectilinear paths, a second conveyor chain cooperating with one portion of said first mentioned chain to apply mechanical pressure to a covered wire disposed between said chains, a third chain cooperating with the other portion of said first mentioned chain to form a second compression means, the wire to be vulcanized being passed successively through the two compressing means, and driving means for advancing the cooperating portions of the different chains in unison.

3. An apparatus for vulcanizing rubber covered wire combining means providing a chamber maintained at a vulcanizing temperature, an endless conveyor chain having two portions guided for movement in different directions and in rectilinear paths, a second conveyor chain cooperating with one portion of said first mentioned chain to apply mechanical pressure to a covered wire disposed between said chains, a third chain cooperating with the other portion of said first mentioned chain to form a second compression means, the wire to be vulcanized being passed successively through the two compression means, driving means for advancing the cooperating portions of the different chains in unison, and a guide roller spaced from said chains and operable to lead the wire from one of said compression devices into the other compression device.

4. An apparatus for vulcanizing rubber covered wire combining means providing a chamber maintained at a vulcanizing temperature, an endless conveyor chain having two portions guided for movement in different directions and in rectilinear paths, a second conveyor chain cooperating with one portion of said first mentioned chain to apply mechanical pressure to a covered wire disposed between said chains, a third chain cooperating with the other portion of said first mentioned chain to form a second compression means, the wire to be vulcanized being passed alternately from the first compression means to the second compression means, drive means for advancing said compression means in unison, and means for guiding said wire from one compression means to the other without causing a stretching of the wire.

5. An apparatus for vulcanizing rubber covered wire combining a pair of spaced sprockets, an endless conveyor supported thereby and having opposed parallel runs formed by a plurality of links connected in end to end relation and adapted to receive a continuous length of wire to be vulcanized, an idler drum at one end of said conveyor around which the wire to be vulcanized is led in passing from one of said runs to the other, a link conveyor movable with the links in one of said runs and cooperating therewith to form a compression device for applying mechanical pressure to the length of wire engaged by said run, and a link conveyor movable with the other run of said endless conveyor and cooperating therewith to compress a length of wire fed thereto from said drum.

6. An apparatus for vulcanizing rubber covered wire combining a pair of spaced sprockets, an endless conveyor supported thereby and having opposed parallel runs formed by a plurality of links connected in end to end relation and adapted to receive a continuous length of wire to be vulcanized, said links having a plurality of laterally spaced longitudinal grooves facing outwardly and adapted to receive a length of wire to be vulcanized, idler drums at opposite ends of said conveyor around which the wire is led in passing successively from the grooves on one side of said conveyor to the grooves on the other side thereof, two endless link conveyors positioned on said sides of said first mentioned conveyor and cooperating successively with said runs, said last mentioned conveyors having longitudinal grooves cooperating with and complemental to the grooves in said first mentioned conveyor, means operable to urge coacting portions of said conveyors together to compress the wire between them, driving means operable to advance the conveyors at the same peripheral speeds, and means providing an enclosing chamber around the conveyors maintained at a vulcanizing temperature.

7. In an apparatus for vulcanizing rubber covered wire, the combination of a pair of opposed blocks adapted to be advanced in unison along a rectilinear path, one of said blocks having a groove extending throughout its length with opposed converging side walls merging into a concave root of the groove, the other block having an elongated tongue adapted to be received in said groove and having a concave surface which cooperates with the root of said groove to define the surface contour of the wire to be formed, said concave tongue surface intersecting the sides of the tongue to form relatively sharp edges which bear against the tapered walls of said groove when the tongue is pressed into the groove.

In testimony whereof, I have hereunto affixed my signature.

WILLIS J. PEELLE.